Figure 1:
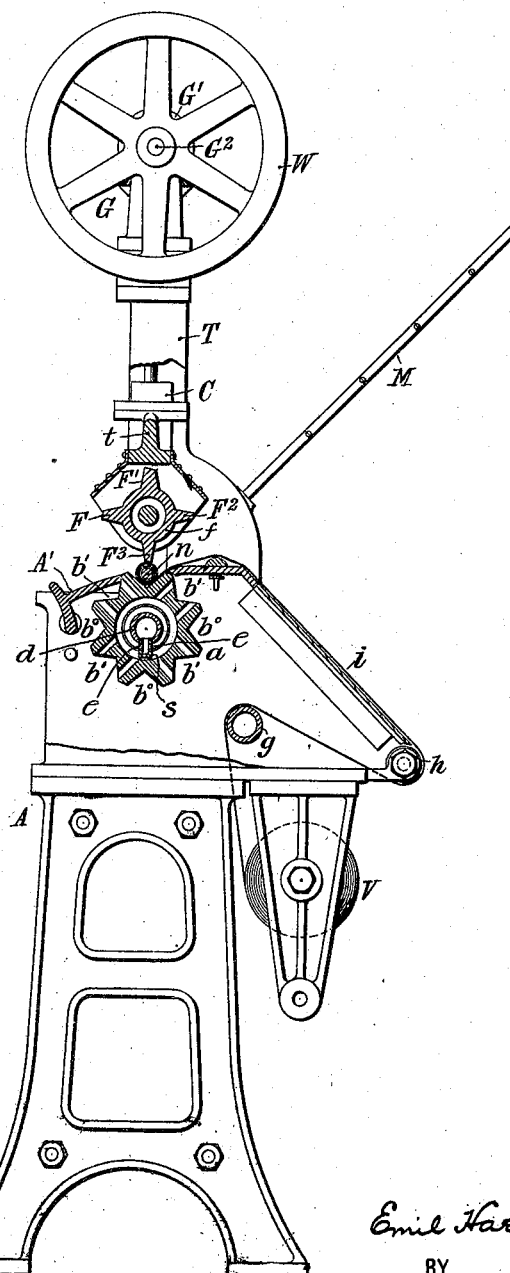

No. 858,387. PATENTED JULY 2, 1907.
E. HAEFELY.
TUBE MAKING MACHINE.
APPLICATION FILED MAY 2, 1906. RENEWED APR. 15, 1907.

2 SHEETS—SHEET 1.

WITNESSES:

INVENTOR

BY

ATTORNEY

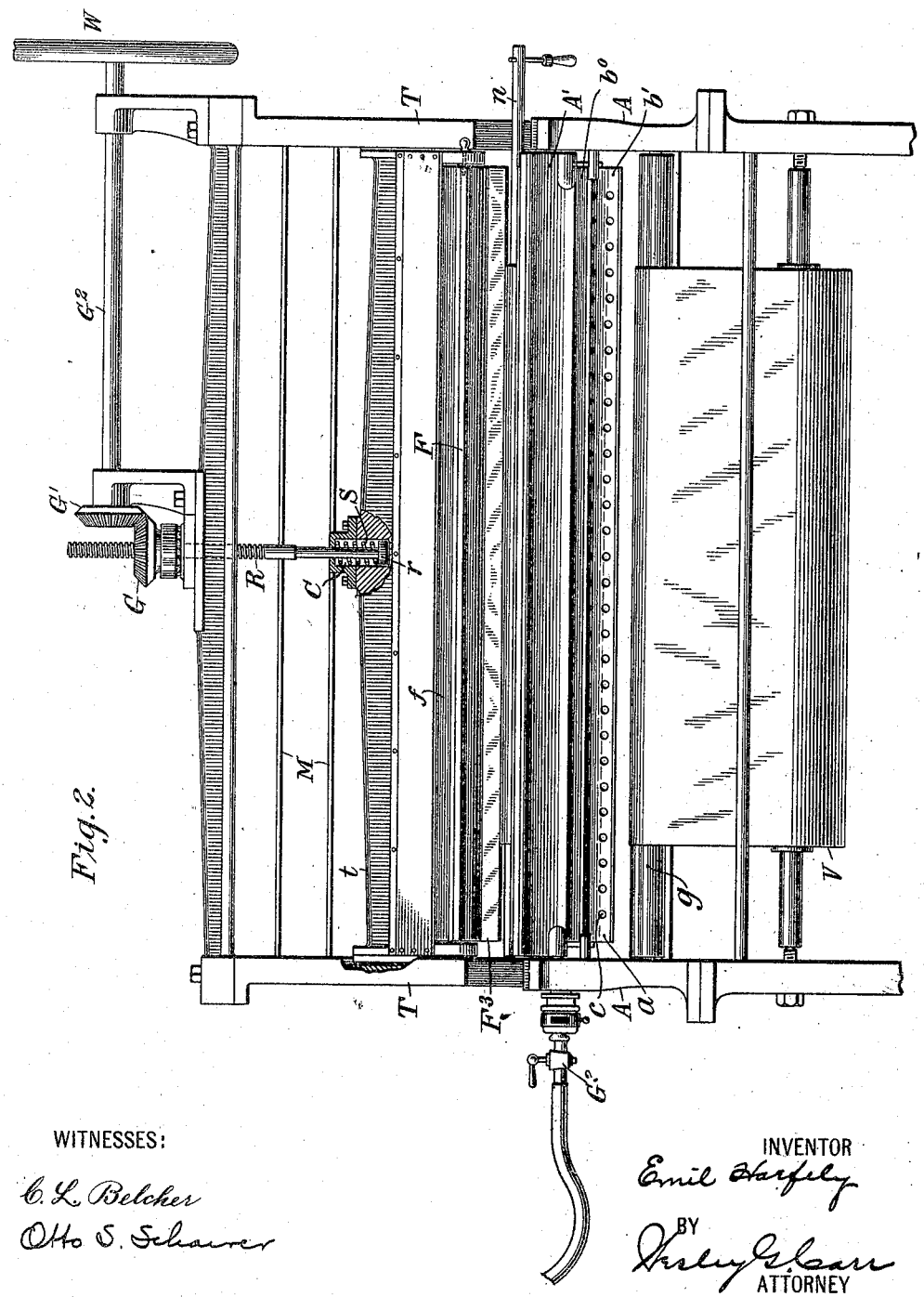

UNITED STATES PATENT OFFICE.

EMIL HAEFELY, OF BASEL, SWITZERLAND, ASSIGNOR TO WESTINGHOUSE ELECTRIC & MANUFACTURING COMPANY, A CORPORATION OF PENNSYLVANIA.

TUBE-MAKING MACHINE.

No. 858,387. Specification of Letters Patent. Patented July 2, 1907.

Application filed May 2, 1906. Renewed April 15, 1907. Serial No. 368,244.

*To all whom it may concern:*

Be it known that I, EMIL HAEFELY, a citizen of the Republic of Switzerland, and a resident of Basel, in Switzerland, have invented a new and useful Improvement in Tube-Making Machines, of which the following is a specification.

My invention relates to machines for making insulating tubes and it constitutes an improvement upon the machine set forth and claimed in my application Serial No. 223,442, filed September 26, 1904.

The object of my invention is to provide means for facilitating the application of insulating fabric and a binder to a mandrel in such manner as to insure the production of tubes of uniform dimensions and homogeneous composition.

In the accompanying drawing, Figure 1 is a view, partially in side elevation and partially in section, of a machine embodying my invention, and Fig. 2 is a rear elevation of a portion of the machine shown in Fig. 1.

Mounted in a suitable frame A is a mandrel holder $a$ the surface of which is provided with eight longitudinal recesses which are of angular or substantially V shape in cross-section and which extend the entire length of the holder parallel to its axis and are designated by the letters $b°$ $b'$, the recesses $b°$ being of the same shape and dimensions as the recesses $b'$ but alternating in position therewith. The interior of the mandrel holder $a$ communicates with the exterior by means of passages $c$ which are uniformly spaced and the outer ends of which terminate in the recesses $b'$.

The recesses $b°$, any one of which may be utilized for holding a mandrel, have polished surfaces, while the surfaces of the recesses $b'$ may be unfinished. Any suitable means may be employed for locking the mandrel holder in the position to which it is rotatively adjusted.

A gas pipe $d$ extends through the interior of the mandrel holder $a$ and is supported in the ends thereof, suitable connections being made to one end thereof by means of a supply hose, as shown in Fig. 2. The pipe $d$ is provided with small branch tubes $s$ having lateral openings $e$.

Above the mandrel holder $a$ is located a pressure device $f$, provided with a plurality of longitudinal ribs or flanges F, $F^1$, $F^2$ and $F^3$ of different thicknesses, the edges of which are slightly chamfered or beveled in order that injury to the material upon which they rest may be avoided. The pressure device $f$ is made rotatively adjustable in order that a rib of the proper thickness may be brought into position to engage the material wound upon a mandrel, the diameter of which determines the thickness of rib required. A suitable device $p$ is provided for locking the device $f$ in any operating position to which it may be adjusted, though any other suitable locking means may be employed.

The pressure device $f$ is supported by a cross bar $t$ which is free to move vertically in guides provided in the standards T of the frame A, suitable gearing being provided for raising the said cross bar when the pressure device is not in use. The gearing here shown comprises a screw-threaded, vertical rod R, bevel gear wheels G and G', the former of which is provided with an internal screw-thread that engages the threaded portion of the rod R. The gear wheel G' is rigidly mounted upon the inner end of a shaft $G^2$ that is mounted in suitable bearings on the top of the frame A and the outer end of which is provided with a hand wheel W. In order that the pressure device $f$ may exert a constant and uniform pressure upon the work and in order that it may be brought into engagement and separated from the work without sudden shock, I provide a lost motion connection between it and the raising and lowering mechanism, the rod R of which projects into a chamber C with which the cross bar $t$ is provided. A coil-spring S is located in the chamber C so that its upper end may engage the upper side of the chamber and its lower end may engage a head $r$ on the lower end of the rod R.

A roll of paper or other fabric which constitutes one of the principal elements of my product is supported in suitable bearings in the frame A, as indicated at V, and the paper drawn therefrom passes over a tension roller $g$, a guide roller $h$ and a table $i$ to a mandrel $n$ of the proper size which rests in the upper recess $b°$ of the mandrel holder.

In order to prevent the free escape of heat through the openings $c$ at the rear of the mandrel holder and also to provide a rest or temporary holder for the mandrel while the first layer of fabric is wound thereon, I provide the frame A with a hinged or pivoted angle bar A' that normally fits into the upper, rear recess $b'$ in the mandrel holder but may be turned backward upon its pivots when inspection, removal or partial rotation of the mandrel holder is found necessary or desirable.

When using the machine above described in accordance with my invention, the gas cock $G^3$ in the hose connection to the gas pipe $d$ is opened and the gas which escapes through the openings $e$ in the branch pipes $s$ is lighted. The air required for supporting combustion is admitted through the passages $c$, the outer ends of which are at the lower side of the mandrel holder $a$ and the products of combustion escape through the passages $c$, the outer ends of which are at the upper side of the mandrel holder, the heat generated within the mandrel holder being thus imparted with substantial uniformity to the outer or shell portion throughout its periphery and length. The products of combustion which issue from the upper right-hand passages $c$ serve to heat the frame portion I which is interposed between the inclined table *i* and the mandrel *n* so that the material fed to the mandrel may be heated to a desired temperature before reaching the mandrel.

As the paper or other fabric is drawn from the roll V over the table *i*, it is provided with a coating of varnish or other suitable binder and the free end is wound close around the mandrel either in the position in which the mandrel is shown or, more conveniently, while the mandrel is resting upon the angle bar A′ at the left of the pressure device. After the mandrel is returned to the position indicated, it is rotated at the speed desired, either mechanically or by hand, in a clockwise direction, so as to apply the fabric with the varnish coating between successive layers. As soon as the single layer of material is wound upon the mandrel and the latter is placed in the recess $b°$, the pressure device *f* is lowered until the entire weight of it and the bar *t* rests upon the material on the mandrel. Inasmuch as the recess $b°$ is of angular or V shape in cross-section and the pressure exerted from above is uniform and constant, the progressively increasing diameter of the tube, as it is formed, does not effect any variation in the degree of density of the material:

While the device manufactured by my machine may consist solely of paper or other suitable fabric and varnish, I prefer to combine mica therewith and, when so combined, thin sheets of mica are placed upon the coating of varnish as it passes to the mandrel.

For the purpose of supporting the sheets of mica as they are fed to the mandrel, I may provide the frame A with a guide rack M of light, skeleton structure. While the guide rack is a useful device, it is not essential, either in the form shown or otherwise.

Inasmuch as the varnish is heated to a comparatively high temperature in passing over the heated portion I of the frame, all volatile constituents are driven off, leaving a layer of uniform consistency and without air bubbles or other particles which might serve to impair the quality of the insulating tube when completed. On account of the continuously applied uniform pressure, no varnish in excess of the amount required as a binder can remain upon the fabric as it is wound upon the mandrel and a tube of absolute uniformity as to consistency and dimensions and having extraordinary insulating qualities and durability is therefore produced.

I claim as my invention:

1. In a machine for making tubes from sheet material, the combination with a frame, of a rotatively adjustable, hollow mandrel holder having a plurality of longitudinal, V shaped recesses and transverse outlets from the interior to some of said recesses and a pivoted angle bar that is adapted to swing into and out of one of the mandrel holder recesses.

2. In a machine for making tubes from sheet material, the combination with a frame, of a hollow mandrel holder having a plurality of longitudinal, V shaped recesses and transverse outlets from the interior to some of said recesses, and a pivoted angle bar that is adapted to swing into and out of one of the mandrel holder recesses.

3. In a machine for making tubes from sheet material, the combination with a frame, of a hollow mandrel holder having a plurality of longitudinal recesses and transverse outlets from the interior to some of said recesses, and a pivoted angle bar that is adapted to swing into and out of one of the mandrel holder recesses.

4. In a machine for making tubes from sheet material, the combination with a frame, of a hollow mandrel holder having a plurality of longitudinal recesses and transverse outlets from the interior to some of said recesses, and a pivoted bar that is adapted to swing into and out of one of the mandrel holder recesses.

5. In a machine for making tubes from sheet material, the combination with a frame, of a hollow mandrel holder having a plurality of longitudinal recesses and transverse outlets from the interior to some of said recesses, a pivoted bar that is adapted to swing into and out of one of the mandrel holder recesses, a mandrel located in one of said recesses, and a pressure device adapted to rest upon the material as it is wound upon the mandrel.

6. In a machine for making tubes from sheet material, the combination with a frame, of a hollow mandrel holder having a plurality of longitudinal recesses and transverse outlets from the interior to some of said recesses, a pivoted bar that is adapted to swing into and out of one of the mandrel holder recesses, a mandrel located in one of said recesses, a pressure device adapted to rest upon the material as it is wound upon the mandrel, and an inclined mica guide attached to the frame adjacent to the front side of the mandrel holder.

7. In a machine for making tubes from sheet material, the combination with a mandrel and a mandrel holder, of a rotatively adjustable pressure device having a plurality of pressure ribs of different thicknesses.

8. In a machine for making tubes from sheet material, the combination with a mandrel and a mandrel holder having a longitudinal recess of V shape in cross-section, of a rotatively adjustable pressure device having a plurality of ribs the pressure faces of which are of different thicknesses.

9. In a machine for making tubes from sheet material, the combination with a mandrel and a mandrel holder having a longitudinal recess of V shape in cross-section, of a rotatively adjustable pressure device having a plurality of ribs the pressure faces of which are beveled and of different thicknesses.

In testimony whereof, I have hereunto subscribed my name this 30th day of April, 1906.

EMIL HAEFELY.

Witnesses:
WESLEY G. CARL,
BIRNEY HINES.